United States Patent [19]

Sugalski et al.

[11] 4,392,102
[45] * Jul. 5, 1983

[54] LIQUID CRYSTAL INDICATOR

[75] Inventors: Raymond K. Sugalski; Charles R. Blake, both of Gainesville, Fla.

[73] Assignee: General Electric Company, Gainesville, Fla.

[*] Notice: The portion of the term of this patent subsequent to Nov. 6, 1996, has been disclaimed.

[21] Appl. No.: 258,532

[22] Filed: Apr. 28, 1981

Related U.S. Application Data

[63] Continuation of Ser. No. 939,356, Sep. 5, 1978, abandoned, which is a continuation-in-part of Ser. No. 910,517, May 30, 1978, Pat. No. 4,173,733, which is a continuation of Ser. No. 793,012, May 2, 1977, abandoned.

[51] Int. Cl.³ .............................................. H02J 7/00
[52] U.S. Cl. ......................................... 320/48; 320/2; 350/351; 116/216
[58] Field of Search ...................... 320/2, 48; 350/330, 350/331 R, 331 T. 336, 337, 357, 350 S; 73/356; 340/366 B

[56] References Cited

U.S. PATENT DOCUMENTS

| | | |
|---|---|---|
| 2,424,059 | 7/1947 | Scott . |
| 2,451,726 | 10/1948 | Fry . |
| 2,980,754 | 4/1961 | Reilly et al. . |
| 3,171,568 | 3/1965 | Arwine . |
| 3,421,142 | 1/1969 | Kircher . |
| 3,435,318 | 3/1969 | Mas . |
| 3,445,291 | 5/1969 | Stein . |
| 3,524,726 | 8/1970 | De Koster ........................ 350/351 X |
| 3,576,604 | 4/1972 | Hammond . |
| 3,590,371 | 6/1971 | Shaw . |
| 3,675,108 | 7/1972 | Nicholl . |
| 3,696,283 | 10/1972 | Ackley . |
| 3,746,961 | 7/1973 | Dobie . |
| 3,817,103 | 6/1974 | Diamond et al. . |
| 3,827,301 | 8/1974 | Parker . |
| 3,846,777 | 11/1974 | Brown . |
| 3,882,490 | 5/1975 | Tashiro et al. ................... 350/331 X |
| 3,898,354 | 8/1975 | Parker ............................. 350/351 X |
| 3,920,996 | 10/1975 | Moore ............................. 350/331 X |
| 3,977,908 | 8/1976 | Kitai . |
| 3,993,809 | 11/1976 | Schranz ................................. 428/1 |
| 4,006,414 | 2/1977 | Parker . |
| 4,009,429 | 2/1977 | Mullersman . |
| 4,022,706 | 5/1977 | Davis .............................. 350/351 X |
| 4,070,912 | 1/1978 | McNaughtan ....................... 374/162 |
| 4,173,733 | 11/1979 | Sugalski et al. . |
| 4,237,409 | 12/1980 | Sugalski . |

FOREIGN PATENT DOCUMENTS

| | | |
|---|---|---|
| 2544940 | 9/1977 | Fed. Rep. of Germany ...... 350/337 |
| 2377885 | of 0000 | France . |
| 1304932 | 1/1973 | United Kingdom . |
| 1344206 | 1/1974 | United Kingdom . |
| 1437752 | 6/1976 | United Kingdom . |
| 1439161 | 6/1976 | United Kingdom . |

*Primary Examiner*—William H. Beha, Jr.
*Attorney, Agent, or Firm*—Henry J. Policinski

[57] ABSTRACT

A liquid crystal indicator label and method for making same includes a liquid crystal material, adapted to change color in response to a change in temperature within a predetermined range, which is adhered to a predetermined surface portion of a transparent substrate and a black background adhered at least behind the liquid crystal material, with an adhesive adhered behind the black background and any portion of the substance not covered by the black background. The liquid crystal is preferably confined to a surface area substantially smaller than the entire surface of the substrate, and a border member is positioned either between the liquid crystal and the substrate or between the liquid crystal and the black background to overlap at least some of the edge portions of the liquid crystal. According to a modified aspect of the invention, the black background covers the entire back surface of the substrate and alpha-numeric characters can be located between the substrate and the black background to display a desired message along with the indicator. As preferable embodied, the label according to the invention is used with a battery charger, with the liquid crystal portion positioned directly adjacent a heat generating circuit element which is adapted to heat up when current flows through battery cells placed in the charger.

9 Claims, 8 Drawing Figures

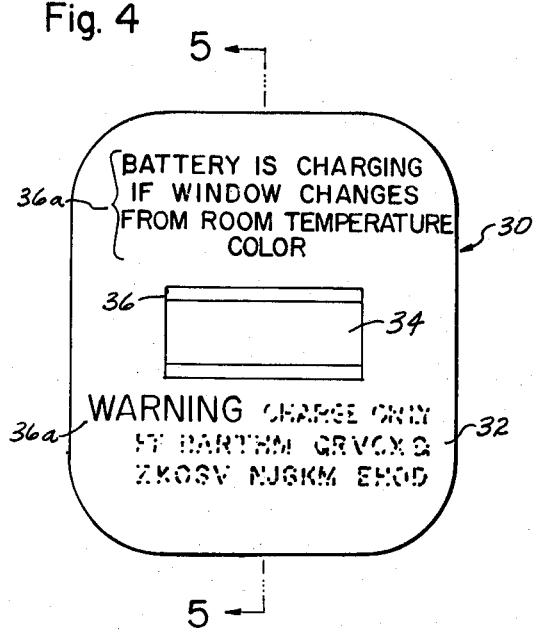
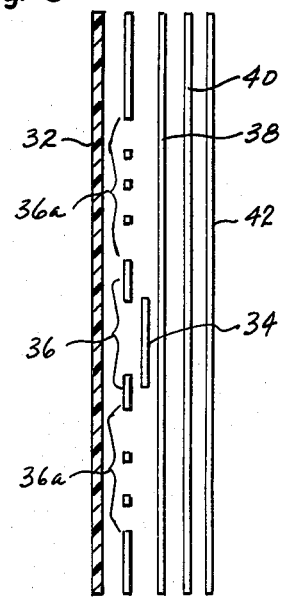
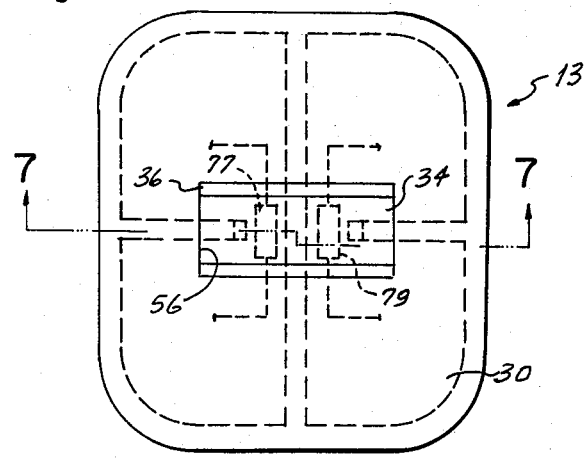
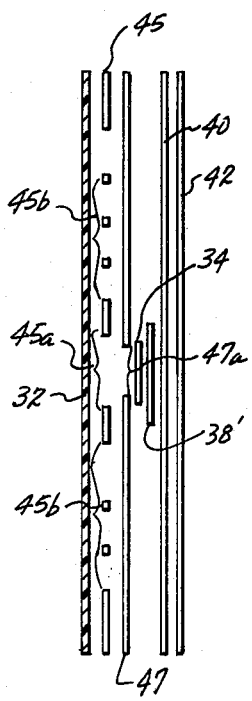
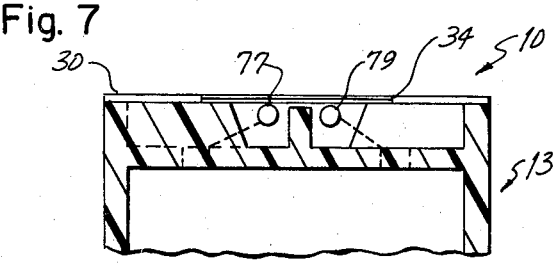

LIQUID CRYSTAL INDICATOR

CROSS REFERENCE TO RELATED APPLICATIONS

This application is a continuation of application Ser. No. 939,356 filed Sept. 5, 1978 (now abandoned) which, in turn, is a continuation-in-part of then co-pending application Ser. No. 910,517 filed May 30, 1978 (now U.S. Pat. No. 4,173,733 granted Nov. 6, 1979) which is a continuation of then co-pending application Ser. No. 793,012 filed May 2, 1977 (now abandoned).

BACKGROUND AND OBJECTS OF THE INVENTION

The present invention relates generally to indicating devices for indicating the existence or occurrence of a predetermined parameter and, more particularly, to a liquid crystal indicating device for indicating the flow of current through a circuit by virtue of a change in temperature in a heat generating element in the circuit.

Indicating devices for indicating the flow of current are particularly useful in such electrical devices as battery chargers since, without such indicators, it is impossible to ascertain whether a particular battery is being charged or is defective. Otherwise, the only way to ascertain whether a cell has been charged is to test the cell or actually use it after it has remained in the charger for the appropriate length of time. Thus, if a cell were defective or installed incorrectly in the charger, one could not know until after waiting until the cell should have charged, thereby wasting that time.

In the prior art, it is known to use an electric lamp to indicate the flow of charging current in a battery charger, such as disclosed in U.S. Pat. Nos. 3,245,726, 3,421,142 and 3,746,961. Although such devices have provided adequate results for certain applications, the indicators must be powered by the charging source, thereby utilizing system current and requiring a larger transformer. In addition, the light bulbs are susceptible to burn-out and could be unreliable as indicators. They also would require replacement and do involve extra costs and weight in the actual fabrication of the charger.

Accordingly, it is an object of the present invention to provide a new and improved liquid crystal indicator, and method for making same. Another object of the invention is to provide a new and improved liquid crystal indicator, and method for making same, for indicating the flow of current through a predetermined circuit.

It is also an object of the invention to provide a new and improved liquid crystal indicator, and method for making same, for indicating the flow of current through a predetermined circuit, wherein the indicator is not energized directly by current in the circuit.

It is a further object of the present invention to provide a new and improved liquid crystal indicator, and method for making same, for indicating the flow of current through rechargeable cells in a battery charger.

It is a further object of the present invention to provide a new and improved liquid crystal indicator, and method for making same, which is relatively lightweight and relatively inexpensive to make.

It is an additional object of the invention to provide a new and improved liquid crystal indicator, and method for making same, for indicating the flow of current through rechargeable cells in a battery charger, which is adapted to include a desired message in addition to or as part of the indicator.

Objects and advantages of the invention are set forth in part above and in part below. In addition, these and other objects and advantages of the invention will become apparent herefrom or may be appreciated by practice with the invention, the same being realized and attained by means of the instrumentalities, combinations and methodologies pointed out in the appended claims. Accordingly, the invention resides in the novel parts, arrangements, combinations, steps, methods and improvements herein shown and described.

SUMMARY OF THE INVENTION

Briefly described, the liquid crystal indicator and method for making same according to the present invention includes a liquid crystal material adhered to a predetermined surface portion of a transparent substrate, the liquid crystal material being adapted to change color in response to changes in temperature within a pre-determined range. A black background is adhered at least behind the liquid crystal material and an adhesive is adhered behind the black background as well as any portion of the substrate not covered by the black background. As preferably embodied, the predetermined area of the substrate to which the liquid crystal is adhered is confined to an area substantially less than the total area of the substrate and a border is applied to the indicator, overlapping at least portions of the edges of the liquid crystal to confine or optically localize the liquid crystal. The border is preferably applied between the substrate and the liquid crystal but may be located between the liquid crystal and the black background.

Advantageously, the black background is adhered behind essentially the entire back surface of the substrate and alpha-numeric characters may be adhered between the black background and the portion(s) of the substrate, which are free of liquid crystal material. In addition, and as preferably embodied, the liquid crystal, the border and the alpha-numeric characters are applied by silk screening techniques. Also advantageously, the alpha-numeric characters may be formed simultaneously with the application of the border, substantially as a single layer.

According to a modified embodiment, the black background layer may be applied directly to the substrate and adapted not only to provide a display opening to accommodate the liquid crystal material and the border but also to provide suitably proportioned openings for defining alpha-numeric characters, if desired. The border material is thence applied behind the black background along the edges of the display opening to define the border around the display opening and also to fill the other openings in the black background layer for highlighting the alpha-numeric characters. The liquid crystal material is thereafter applied to fill the display opening provided by the black background in the border. An additional black background is applied behind the liquid crystal layer, with an adhesive layer applied to the back surface of all the foregoing elements.

Accordingly, it will be found that the objects and advantages of the invention specifically enumerated herein are achieved by the invention as here embodied. Thus, it will be found that a new and improved liquid crystal indicator, and method for making same, is provided by the present invention, which is inexpensive to make and gives rapid indication of the parameter being monitored.

It will be found that by confining the liquid crystal material to a predetermined area of the substrate, particularly where the predetermined area is substantially less than its total surface area, a liquid crystal indicator may be provided which is relatively inexpensive to fabricate yet completely effective as an indicator. In addition, it will be found that alpha-numeric characters may be formed on any portion of the substrate, even that bearing the liquid crystal material for enhanced display. Moreover, the label made in accordance with the present invention enables direct registration between the liquid crystal material and the current-responsive heat generating elements in a battery charging device.

It will also be found that by adhering a border to the substrate, overlapping at least a portion of the edges of the liquid crystal material applied to the indicator label, a neat and well defined window is provided for optically confining the visible liquid crystal material.

It will further be found that the liquid crystal indicator, and method for making same, according to the present invention enables the use of silk screening techniques for relatively easy and inexpensive application of the liquid crystal material and the border as well as any alpha-numeric characters applied thereto.

In addition, it will be found that the liquid crystal indicator according to the present invention provides indication of the flow of current without drawing current from the circuit to be monitored, since the indicator can be positioned adjacent a resistor or other circuit element which can be used in the circuit to, for example, provide the appropriate voltage in the circuit.

It will be understood that the foregoing general description as well as the following detailed description are explanatory of the invention and are not intended to be restrictive thereof. Accordingly, the accompanying drawings, referred to herein and forming a part hereof, illustrate preferred embodiments of the invention and, together with the description, serve to explain the principles of the invention.

BRIEF DESCRIPTION OF THE DRAWINGS

FIG. 4 is a plan view of a liquid crystal indicator label made in accordance with the present invention.

FIG. 5 is an exploded sectional view taken along section 5—5 of FIG. 4.

FIG. 6 is a top view of the cell-holder module of FIG. 1 with the indicator label of FIG. 4 affixed thereto.

FIG. 7 is a sectional view taken along section 7—7 of FIG. 6.

FIG. 8 is an exploded sectional view similar to that shown in FIG. 5 of a liquid crystal indicator label constructed in accordance with another aspect of the invention.

DETAILED DESCRIPTION OF PREFERRED EMBODIMENTS

Figure 1:
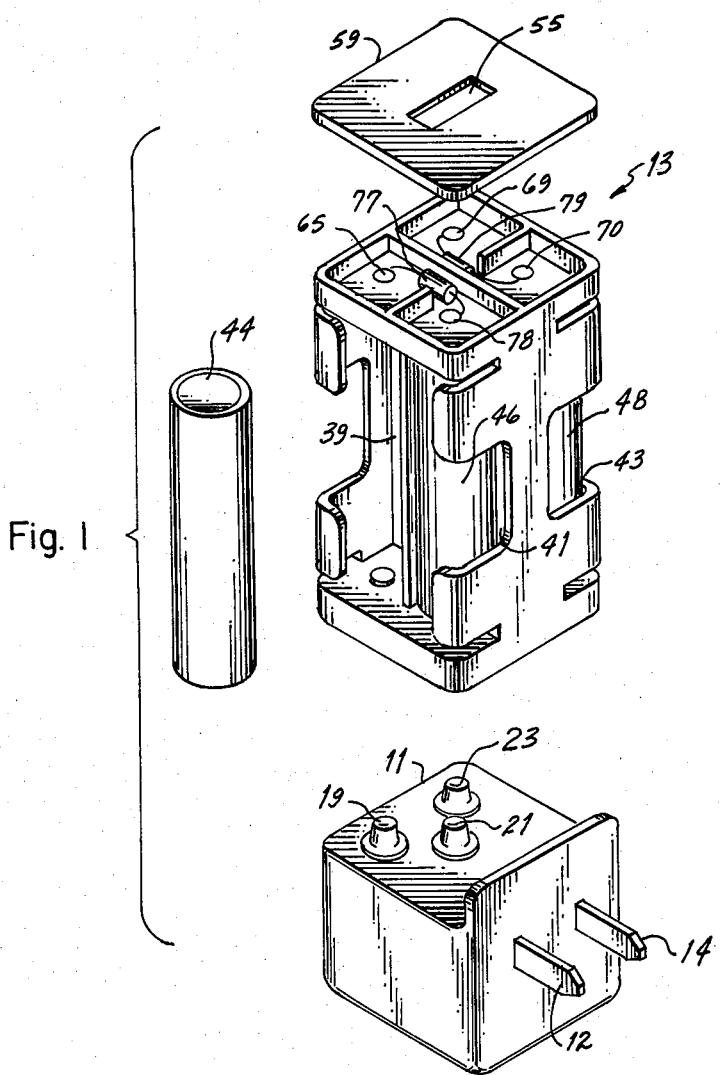
FIG. 1 is a perspective view of a charger current source and a cell-holder module utilizing a liquid crystal indicator.

A battery charging module and charging current source is illustrated in FIG. 1, which, except as hereinafter described, is essentially identical to the embodiment disclosed in U.S. Pat. No. 4,009,429 which is hereby incorporated by reference herein. The charger assembly includes charge current source 11 and charging module 13, which for purposes of illustration is sized to accommodate "AA" cells. It will be understood that the present invention is not limited to the size and/or particular configurations of the charger assembly herein described.

Charge current source 11 may be any suitable source of charging current, such as a conventional high impedence centertapped transformer, contained within housing 11 from which plug blades 12 and 14 extend for connection to a source of 120 volt AC current and to which button terminals 19, 21 and 23 are attached for releasable snap-fitting into corresponding terminals (not shown) formed on module 13.

The module 13 is preferably made of a molded plastic construction and comprises a plurality of compartments for mounting cells of a particular type. As shown, module 13 has four compartments, 39, 41, 43 and 45 (not visible) for accommodating four cells. Module 13 is here shown with an "AA" cell 44 displaced outwardly of compartment 39.

Module 13 also includes liquid crystal charge current indicators 55 mounted in end wall 59. The indicator 55 is disposed in physical contact with heat-generating circuit elements (viz, diodes 77 and 79) in the charge current circuits (shown in FIG. 3). When a charge current is flowing in the circuit (FIG. 3), a visually detectable change in color is provided by indicator 55 responsive to the change in temperature of either one or both diodes 77 and 79. Indicator 55 is sized such that a central portion of the indicator changes color responsive to the heat generated by the diode while the surrounding portion of the indicator has a contrasting color responsive to the ambient temperature. The total area of the indicator is preferably at least two to four times the area of the indicator in contact with the heat-generating circuit element.

The liquid crystal indicator, which is a microencapsulated cholesteric liquid crystal material such as is commercially available from Djinnii Industries, Dayton, Ohio, preferably has a visually detectable color change indicative of the flow of charge current in ambient temperatures of from 50° F. or lower to at least 95° F. and preferably about 110° or higher and thus is operable in most ambient conditions to which the charger will be exposed during normal operation. For example, a visually detectable indication is provided on the indicator in about 15 sec. at 50° F. and about 2 sec. at 95° F. Thus, a rapid indication is provided of the fact that charge current is being supplied to cells mounted in modules 13, 15.

Figure 2:
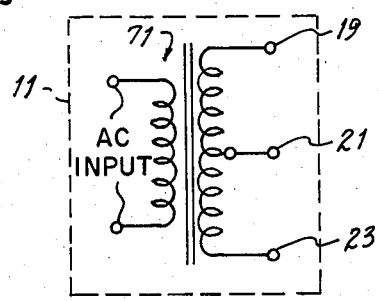
FIG. 2 is a circuit diagram of the charge current source shown in FIG. 1.
Figure 3:
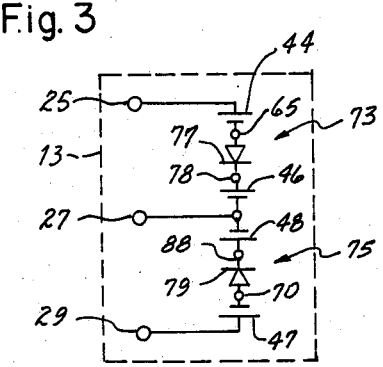
FIG. 3 is a circuit diagram of the cell-holder module shown in FIG. 1.

FIGS. 2 and 3 show diagrams of an electrical charging circuit for the charging system. FIG. 2 shows the circuit diagram of the charge current source 11. FIG. 3 shows the circuit diagram of module 13 for charging either two or four "AA" cells. It will be understood that other configurations for charging modules may be used as explained more fully in the referenced U.S. Pat. No. 4,009,429 or the parent of the present application, Ser. No. 793,012, filed May 2, 1977 and now abandoned, which is also incorporated by reference herein.

As shown in FIG. 2, the source 11 comprises a transformer 71 to make available from the standard 110–120 volt 60 cycle AC line an output current of the appropriate magnitude for the load provided by module 13. The terminal 21 is centrally tapped to the secondary of transformer 71 to provide equal and opposite AC input voltages for module 13.

As shown in FIG. 3, the circuit for module 13 comprises two sections 73 and 75 for accommodating either two or four AA cells for charging. If only two cells are to be charged at one time, both of the cells must be disposed in the same circuit section so as to form a complete charge current path. Section 73 connects a pair of AA cells 44 and 46 disposed in compartments 39 and 41 in a series relationship for charging via a charge current path formed by connection of the module terminals 25 and 27 to charger terminals 19 and 21, respectively. Similarly, section 75 connects a pair of AA cells 47, 48 disposed in compartments 43, 45 in a series relationship for charging via a charge current path formed by connection of the module terminals 27 and 29 to charger terminals 21 and 23, respectively.

Diodes 77 and 79 are connected in sections 73 and 75, respectively, to prevent the inadvertent shorting of the branches 73 and 75 when disconnected from source 11. Diode 77 is connected between cells 44 and 46 at contacts 65 and 78. Diode 79 is connected between cells 47 and 48 at contacts 69 and 70. When cells are loaded in module 13, the cells in section 73 and 75 are unable to deliver excessive power to a load connected between terminals 25, 27 and 29. Diodes 77 and 79 also rectify the current supplied by source 11 when module 13 is connected thereto.

While it is preferred to operate the indicator responsive to the temperature change of a diode, other heat-generating circuit elements such as a resistor may be used to actuate the indicator. However, one advantage arising from the use of a diode as the heat-generating circuit element relative to a resistor is that the power variation in many applications, caused by current fluctuation in the charge circuit, is much less for a diode than a resistor. This is so because for a diode the power varies linearly with current and for a resistor the power varies as the square of the current. Thus in many applications using a resistor, the power variation is beyond that which can be tolerated by conventional liquid crystal materials. Also it is desirable to use the charger in a wide range of ambients which even further constrains acceptable power variations. The current fluxuations result from inherent variation in standard line voltage and from the variation caused by the recharging of cells at various charge levels upon initiation of charging and cannot be controlled without adding cost and complexity to the charge circuit.

Referring now to FIGS. 4 and 5, there is shown a preferred embodiment of a liquid crystal indicator label according to the present invention, which may be utilized in place of both indicator 55 and end wall 59. According to the embodiment shown herein, a liquid crystal indicator label (designated at 30) includes substrate 32, preferably made from a transparent material such as clear polyester sold under the name "MYLAR" by E. I. du Pont de Nemours. A limited amount of liquid crystal material, indicated at 34, is thence adhered to substrate 12 (by the usual techniques known in the art) within only a predetermined surface area of the substrate. As explained above, the liquid crystal material may be a microencapsulated cholesteric liquid crystal material such as is commercially available from Djinnii Industries, Dayton, Ohio.

As preferably embodied, the liquid crystal so applied is confined to a predetermined area which is substantially less than the total area of substrate 32. In addition, a border, indicated at 36, is applied so as to partially overlap the edge portions of the liquid crystal material. Thus, it will be found that since the edges of the liquid crystal layer will be irregular or uneven despite the care with which it is applied to substrate 34, border 36 will prevent the irregularity from being visible to an observer.

Black background layer (shown at 38 in FIG. 5) may thence be applied behind liquid crystal layer 34, at least over the area corresponding to the predetermined area of the liquid crystal. It will be understood that black background 38 may be any suitable material known to interact optically with the liquid crystal material for permitting the desired color change, in response to a change in temperature imposed on the liquid crystal, to be visible.

Border 36 may be applied directly behind liquid crystal layer 34 to separate black background 38 from the liquid crystal material overlapped by border 36, so that any change in color of the overlapped portion of the liquid crystal material will not be visible and the "window" provided by border 36 will define the perceivable configuration of liquid crystal material 34. However, as preferably embodied, border 36 may first be applied to substrate 32, followed by the application of liquid crystal 34. In this configuration, border 36 will directly prevent any visibility of the overlapped portion of liquid crystal layer 34.

Adhesive layer 40 is applied behind black background 38 and may be made of any suitable adhesive material or may be a double-sided adhesive strip having one side applied to black background 38. In either event, the free surface of adhesive layer 40 is covered with a suitable removable protective backing (indicated at 42) to protect the adhesive until label 30 is ready to be attached in place. In addition, adhesive 40 is preferably adhered behind liquid crystal material 34, which helps increase heat transfer from the heat generating circuit elements, thereby permitting a more rapid response of the indicators.

As preferably embodied, label 30 includes another layer portion (indicated at 36a), essentially identical to border layer 36, which is adapted to provide a message for simultaneous display with liquid crystal layer 34. To this end, layer 36a comprises a plurality of alphanumeric characters adhered behind substrate 32 in the portion thereof not covered by liquid crystal layer 34. In addition, black background layer 38 is adhered over the entire back surface area of substrate 32, with additional layer 36a therebetween. Thus, black background 38 also provides a suitable background for viewing the message provided by layer 36a.

Layers 36 and 36a are preferably made of a brightly colored paint or a metallic paint, such as an aluminized paint or strips of aluminized material. Layer 36a could, however, be applied between substrate 32 and the liquid crystal layer so that, as the liquid crystal changed color, the message provided by the characters of layer 36a would be emphasized.

Also as preferably embodied, liquid crystal layer 34 and border layer 36, as well as additional layer 36a (if used) are applied by silk-screening techniques, whereby each layer is applied in a stencil-like manner for preventing any waste of materials, particularly the liquid crystal which is relatively expensive. In addition, the liquid crystal will be applied in a relatively small area, where it will serve its indicating function without waste of material.

Turning then to FIGS. 6 and 7, label 30 has been illustrated as adhered to module 13, described above, for indicating the flow of current through diodes 77 and 79. As here embodied, label 30 is applied to module 13 instead of end wall 59. Thus, heat-generating elements 77 and 79 are positioned directly adjacent the adhesive behind the liquid crystal layer of indicator label 30 to ensure that the liquid crystal portion thereof can respond essentially instantaneously to the heat generated in these elements. The area of liquid crystal 34 bounded by border 36 is sized so that only a portion of liquid crystal layer 34 is actually in contact with the elements 77 and 79 so that a central portion of the liquid crystal changes color while the surrounding portion has a contrasting color responsive to the ambient temperature to indicate the flow of charging current.

Advantageously, the liquid crystal material used in label 30 is adapted to provide a visually detectable color change in response to the heat generated in heat generating diodes 77 and 79 in ambient temperatures between 50° F. and about 110° F., so that the label is operable in most ambient, particularly room temperature, conditions. Thus, in the embodiment shown in FIGS. 6 and 7, when charging current is flowing through a cell, its associated diode (77 or 79) will become heated, thereby causing a visible color change in a portion of the liquid crystal segment 34 of label 30. Accordingly, a person placing the cell in the charger will know almost immediately whether the cell is defective by observing the occurrence, or absence, of a change in color.

In some types of chargers, once the cell has charged, current will cease flowing through diodes 77 and 79. Therefore, the label may again change color by returning to the ambient temperature color to indicate that the cell is fully charged. However, in other chargers, an "overcharge" current will continue to flow through the cells, which generally will not damage the cells. Therefore, the liquid crystal will still exhibit a portion having a different color from the ambient temperature.

Turning now to FIG. 8, there is shown an alternate construction for label 30. As here embodied, a black background layer 45 is applied directly behind substrate 32, with a display opening (indicated at 45a) and, if desired, openings (indicated at 45b) in the form of alpha-numeric characters formed therein. Bright background layer 47, essentially identical to layers 36 and 36a described above, is adhered behind layer 45 to appear in openings 45b and to provide a border (indicated at 47a), similar to border 36 described above, around display opening 45a. Liquid crystal layer 34 is thence applied behind layer 47, with a small black background layer 38' therebehind, and with adhesive layer 40 and protective backing 42 therebehind, substantially as described above.

It will be understood that by forming the alpha-numeric characters in black background layer 45, greater image clarity may be attained over direct printing with metallic paints.

It will be readily appreciated by those skilled in the art that the invention in its broader aspects is not limited to the specific embodiments herein shown and described. For example, border 16 may be made in the form of alpha-numeric character(s), or other identifying form(s), for providing direct operable-status indication for a specifically identified cell. In addition, label 30 can be adhered to any structure in the charging apparatus (e.g. the transformer) which includes heat generating circuit element(s) adapted to be indicative of the flow of charging current in the battery cells.

It will also be understood that more than one layer of liquid crystal material may be applied to substrate 32, with each layer responsive within different temperature ranges so that indictor label 30 is responsive to an overall larger temperature range than with a single layer of liquid crystal material. Also, layer 36a may be applied as part of border layer 36, but with appropriately configured void spaces to define the viewing window for liquid crystal layer 34 and the desired alpha-numeric characters which are visible by virtue of black background layer 38 adhered therebehind.

Accordingly, variations may be made from the embodiments described herein, which are within the scope of the accompanying claims, without departing from the principles of the invention and without sacrificing its chief advantages.

What is claimed is:

1. A liquid crystal indicator for indicating the flow of current through battery cells in a battery charger for charging, which includes a liquid crystal indicator label comprising:

a substantially transparent substrate having a front surface adapted to provide an exterior surface of said indicator and a back surface on the opposite side thereof;

a liquid crystal material adhered to a predetermined portion of said back surface of said substrate, said predetermined portion being less than the surface area of said back surface, said liquid crystal material being adapted to change color in response to changes in temperature within a predetermined range;

a black background layer adhered at least behind said liquid crystal material within the predetermined portion of said substrate; and means for attaching the indicator to a desired structure, said liquid crystal indicator label being mounted to the casing of the battery charger substantially directly adjacent heat generating circuit means associated with each battery cell in the battery charger such that said liquid crystal indicator label changes color when charging current flows through said heat generating circuit means to indicate that the associated battery cell is being charged.

2. A liquid crystal indicator for indicating the flow of current through battery cells in a battery charger for charging, which includes a liquid crystal indicator label comprising:

a substantially transparent substrate having a front surface adapted to provide the exterior surface of said indicator and a back surface on the opposite side thereof;

a liquid crystal material adhered to a predetermined portion of said back surface of said substrate, said predetermined portion being less than the surface area of said back surface, said liquid crystal material being adapted to change color in response to changes in temperature within a predetermined range;

a black background layer adhered at least behind said liquid crystal material within the predetermined portion of said substrate; and an adhesive adhered to said black background layer and to any portion of said substrate not covered by said black background layer, said liquid crystal indicator label being mounted to the casing of the battery charger substantially directly adjacent heat generating circuit means associated with each battery cell in the battery charger such that said liquid crystal indicator label changes color when charging current flows said heat generating circuit means to indicate that the associated battery cell is being charged.

3. A liquid crystal indicator according to claim 2, wherein the predetermined portion of said substrate is substantially less than the entire area of said back surface.

4. A liquid crystal indicator according to claim 3, which further includes a border means adhered between said black background layer and said substrate and at least partially adhered directly behind said liquid crystal layer along at least a portion of its edge portion, said border means exposing said liquid crystal material in a desired discrete pattern substantially without masking any relatively large surface area portion of said substrate, and wherein said black background layer is adhered to essentially all the area of the back surface of said substrate.

5. A liquid crystal indicator according to claim 4, wherein said border means comprise strips of metallic-like paint.

6. A liquid crystal indicator according to claim 3 or 5, wherein said liquid crystal material is silk screened onto said substrate.

7. A liquid crystal indicator according to claim 4, which further includes alpha-numeric characters adhered between said substrate and said black background layer for providing a message on said substrate.

8. A liquid crystal indicator according to claim 7, wherein said liquid crystal layer, said border means and said alpha-numeric characters are silk-screened between said substrate and said black background layer.

9. A liquid crystal indicator according to claim 3, wherein the heat generating circuit means comprise diodes coupled in series with each battery cell to be charged.

* * * * *